Sept. 3, 1940.  T. A. PETERMAN  2,213,473
MULTIPLE WHEEL VEHICLE DRIVE
Filed Oct. 5, 1937  3 Sheets-Sheet 1
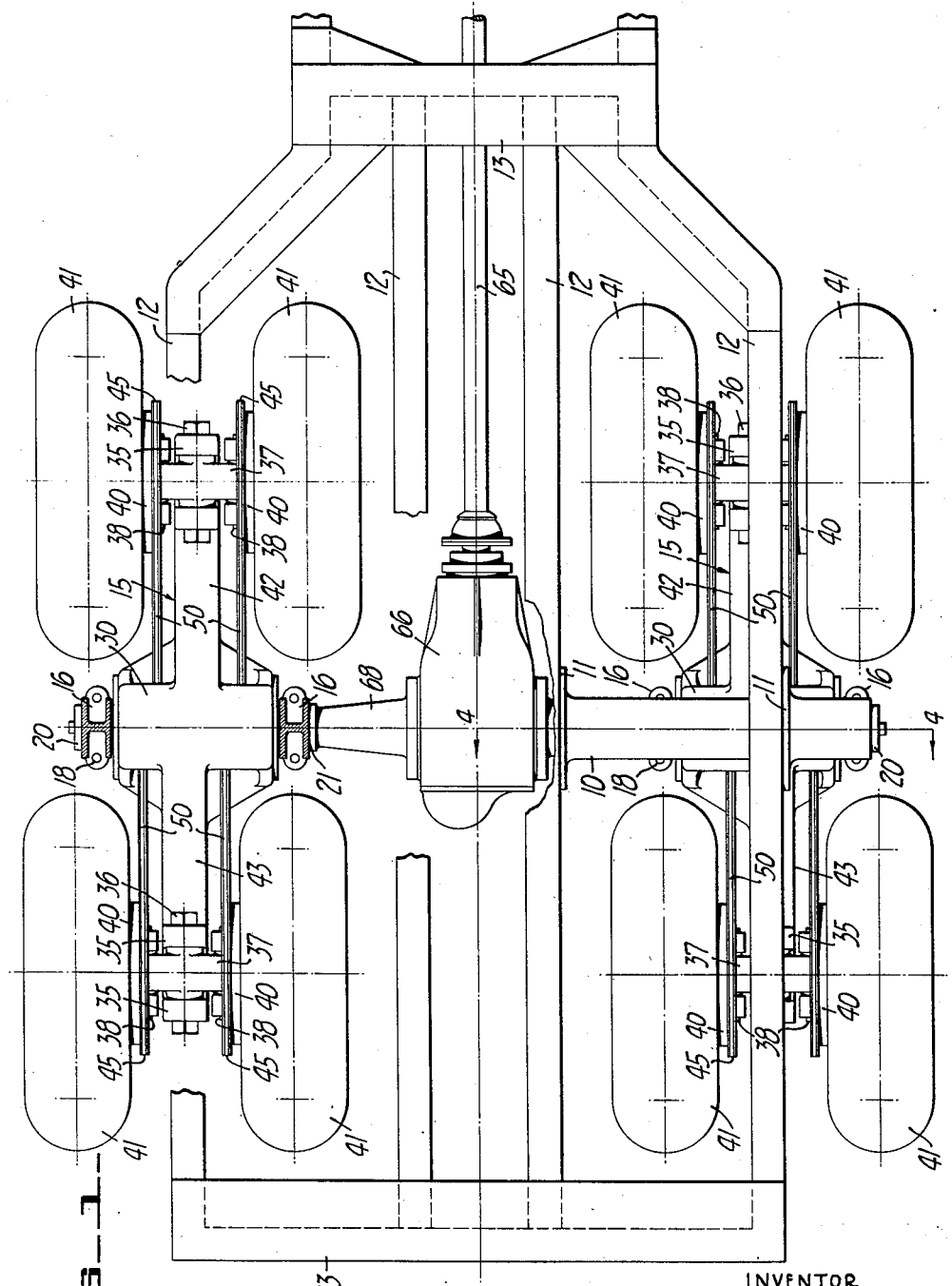
INVENTOR
Theodore A. Peterman
BY
ATTORNEY Sept. 3, 1940.   T. A. PETERMAN   2,213,473
MULTIPLE WHEEL VEHICLE DRIVE
Filed Oct. 5, 1937   3 Sheets-Sheet 2
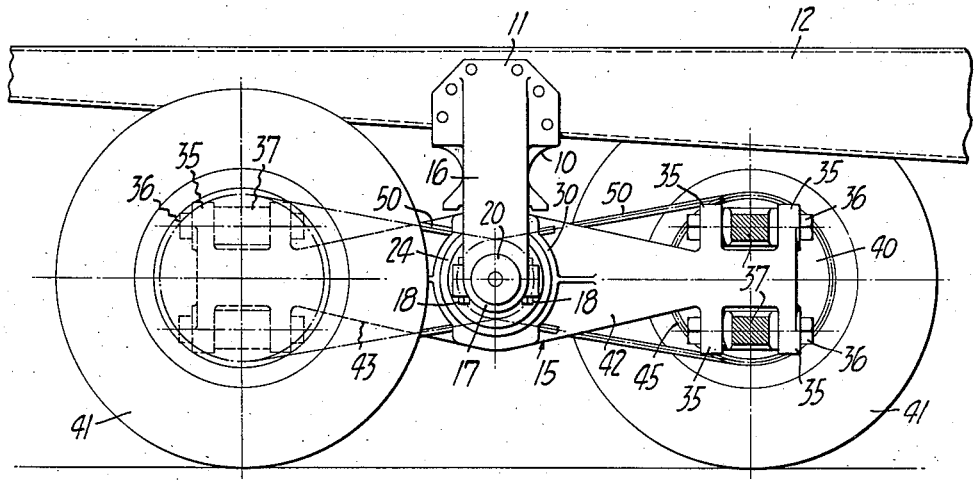
FIG_2_
FIG_3_
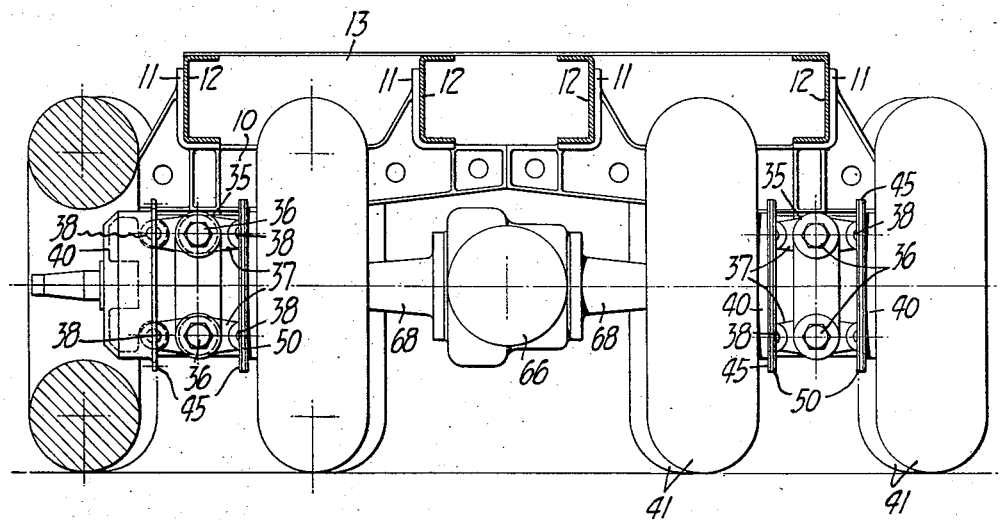
INVENTOR.
Theodore A. Peterman
BY
ATTORNEY.

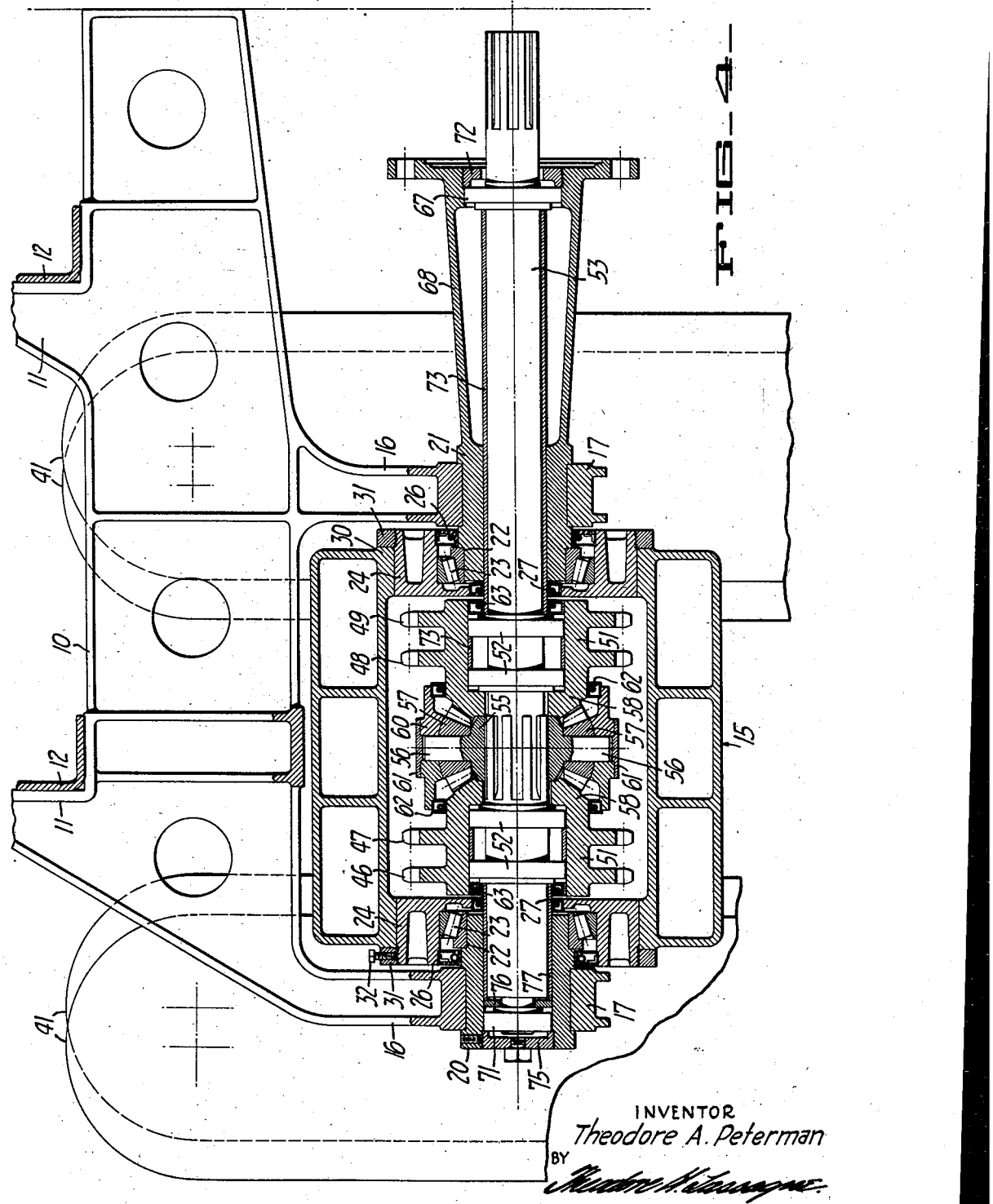

Patented Sept. 3, 1940

2,213,473

UNITED STATES PATENT OFFICE 2,213,473

MULTIPLE WHEEL VEHICLE DRIVE

Theodore A. Peterman, Tacoma, Wash.

Application October 5, 1937, Serial No. 167,378

21 Claims. (Cl. 180—22)

The present invention relates to multiple wheel driving mechanism for vehicles, and more particularly to drives for such vehicles in which the wheels are suspended for independent movement with respect to the frame.

The transmission of motive power to more than two wheels of a multiple wheeled vehicle, especially where the driving wheels are suspended for independent movement with respect to the vehicle frame, has heretofore presented such problems as to prevent any general adoption of vehicles of the class with which the present invention is concerned. Such vehicles, provided with four or more independently movable driving wheels, advantageously combine the features of trailers having similar suspensions, which are capable of transporting great loads over both smooth highways and rough terrain without sacrificing speed in the first case or stability in the second, with the features of track driven vehicles having an extended tractive contact with the terrain, but lacking the advantages in the way of riding qualities which multiple wheeled vehicles of the above type possess.

It is a principal object of the present invention, therefore, to provide a tractive arrangement for multiple wheeled vehicles which combines the tractive advantages of multiple wheel drive with the advantages of independent wheel suspension.

A further and more specific object of the invention is to provide an improved, simple and dependable transmission for driving such multiple wheeled vehicles.

Additional objects and advantages of the invention will appear to those skilled in the art from the following description of a preferred embodiment thereof, illustrated in the accompanying drawings, in which:

Figure 1 is a plan view of the driving wheels and a portion of the frame of a vehicle embodying the invention, certain parts being broken away to show underlying structure;

Fig. 2 is a side elevational view of one of the wheel suspension assemblies, one wheel being removed and the supporting rocker links therefor shown in section to illustrate the suspension and drive mechanism;

Figure 3 is a rear elevational view of the vehicle, the frame beng sectioned and a portion of one wheel broken away to more clearly shown the construction; and Figure 4 is a vertical sectional view, in detail, of one of the outboard differential assemblies, taken on the line 4—4 of Figure 1.

The illustrated rear portion of the vehicle comprises, in general, a bolster frame providing a pivotal mounting for a pair of longitudinally extending equalizer beams on each end of which a pair of wheels is suspended by a parallel linkage, the arrangement being such as to permit independent vertical movement of each wheel with respect to its associated wheels, and of each pair of wheels with respect to the associated pairs of wheels. The main frame members of the vehicle body are supported at the rear on the bolster frame, and at the front on any ordinary type of frontal structure embodying an engine, not shown. The illustrated drive shaft connects the engine with a conventional type of differential disposed below the bolster frame, from which power is transmitted by laterally extending shafts to a pair of outboard differentials coaxial with the pivotal mountings of the equalizer beams. Thence it is transmitted to each of the wheels by separate chain drives, the parallel linkage suspensions of the wheels constraining the sprockets thereon to move vertically in a plane substantially coincident with the plane in which the sprockets on the outboard differentials are disposed.

The body members, shown in Figures 1 to 3 comprise a bolster frame 10 having upwardly extended angular portions 11, longitudinally extending channels 12 secured to and supported adjacent their rear ends in the angular portions 11 of said bolster frame 10, and cross members 13 secured to the channels 12 to form a rigid bed for a truck body of any desired character.

The bolster frame 10 is provided adjacent its opposite ends, with means for pivotally supporting a pair of equalizer beams 15. Integral bolster arms 16 depending in pairs from adjacent each end of the bolster frame 10 are provided with caps 17 removably secured thereto by bolts 18 to retain a pair of bolster bushings 20 and 21 adjacent the lower end of each pair of bolster arms. The opposite ends of the bolster bushings 20 and 21 are shouldered as at 22 to provide seats for roller bearings 23 retained on said seats by bearing cages 24 and sealed by oil seals 26 and 27 of standard construction. Equalizer beams 15 extend longitudinally of the vehicle and each has a hub 30 secured upon two of the adjacent bearing cages 24 by set nuts 31 held in place by means such as set screws 32. This arrangement is such as to permit rocking movement of the beams 15 upon bearings 23 about bolster bushings 20.

A parallel linkage wheel suspension is disposed adjacent the opposite ends of each of the equalizer beams 15, comprising in the embodiment illustrated, one upper and one lower rocker link for each pair of wheels, each link being pivotally mounted on the equalizer beam and pivotally connected to its pair of road wheels. Preferably formed integrally with each equalizer beam are four pairs of rocker link supports 35, and a pivot pin 36 extends between each such pair of supports to provide a pivotal mounting for each of the rocker links 37, the opposite ends of each rocker link being pivotally connected, as at 38 to the hub assemblies 40 of road wheels 41. This lever system permits vertical movement of the wheels 41 independently of the beams 15, by virtue of the rocking movement of links 37 about the axes of pins 36, but constrains each of the wheels to move in substantially a single plane and always parallel to the plane of rocking movement of beams 15.

Individual driving connections connect each of the road wheels with differential mechanism mounted on the pivotal axis of each of the equalizer beams. The oppositely extending arms 42 and 43 of the equalizer beams 15 are laterally offset, as shown in Figure 1, so that, where identical hub assemblies 40 and parallel linkage suspensions therefor are mounted at the opposite ends of each equalizer beam 15, sprockets 45 on each hub assembly 40 will lie in substantially the same vertical plane as one of the sprockets 46, 47, 48 and 49 of a differential mechanism mounted on the pivotal axis of each beam 15, and said sprockets may be connected by means such as chains 50 so that each wheel 41 will be driven by an individual driving connection through one of said differential mechanisms.

Since the parallel linkage suspension employed to mount the wheels 41 on the beams 15 constrains the wheels to move in substantially a single plane and prevents tipping of any wheel sprocket 45 with respect to the differential sprockets 46, 47, 48 or 49 with which it is entrained, the risk of the connecting chains 50 running off of either of their sprockets is minimized.

The differential mechanisms mounted on the pivotal axes of the several equalizer beams 15 permit the right and left pairs of wheels on each beam to be driven at different speeds in maneuvering the vehicle. The hubs 51 (Figure 4) of sprockets 46, 47 and 48, 49 respectively, are rotatably mounted, by means such as roller bearings 52 on laterally extending drive shafts 53, there being one such shaft 53 for each of these outboard differential mechanisms. Splined to the shaft 53 in each of the outboard differential mechanisms, is a spider 55 provided with a plurality of radial arms 56 on each of which a bevel pin 57 is rotatably mounted in position to mesh with level gears 58 on the adjacent ends of the hubs 51. Pinions 57 are retained on arms 56 by a differential housing 60, divided into halves on a circumferential line for assembly, and secured in place by bolting the halves together. Caps 61 secured to the housing 60 close the apertures therein into which arms 56 of the spider extend, to prevent oil leakage, and oil seals 62 and 63, of standard construction, are disposed in the openings adjacent the edges of the differential housing 60 and the free ends of the sprocket hubs 51, respectively.

The two outboard differentials described above are driven by the main drive shaft 65 of the vehicle (Figure 1) through any standard type of differential mechanism 66 by means of which the two laterally extending shafts 53 (Figure 4) may be driven at different speeds as the vehicle is maneuvered. Each of the shafts 53 is mounted in an inner roller bearing 67 retained in drive shaft housing 68, conveniently formed integrally with bolster bushing 21, and an outer roller bearing 71 retained in bolster bushing 20. Bearing set nut 72, threaded into housing 68 and apertured to pass lubricant from the main differential 66, adjusts bearing 67 and inner bearings 52 through sleeves 73, while bearing set nut 75 threaded into bolster bushing 20 serves to effect adjustment of bearing 71 and, through spacer 76 and sleeves 77, of outer bearings 52.

The embodiment of the invention which has been described provides a simple and dependable transmission mechanism for driving a plurality of independently suspended road wheels from a single source of power mounted on the vehicle frame, and has many related advantages and improvements over prior structures of its general class. Instances thereof are the suspension of the driving wheels so that their sprockets are maintained substantially co-planar with their driving sprockets during all movements of the wheels over the terrain, the offsetting of the fore and aft driving wheels to obtain the effect of broader tractive engagement with the terrain, and the connection of fore and aft wheels, as a pair, to one side of the differential mechanism to obviate the necessity for use of a locking differential and at the same time prevent a total loss of traction by a plurality of wheels due to slipping of one.

The foregoing and other advantages will be apparent to those skilled in the art to which the invention pertains, and will also be apparent that either part or all of such feature may be embodied in a vehicle of the class described, in either the form disclosed or such equivalent thereof as will occur to designers of such vehicles. The invention, therefore, is not to be considered as restricted to the embodiment herein disclosed, except as required by the prior art and the spirit of the appended claims.

I claim:

1. In a motor vehicle, a frame, a plurality of longitudinally extending equalizing devices pivotally mounted on said frame, a plurality of transverse pairs of road wheels, parallel linkage suspensions connecting said transverse pairs of wheels with said devices, a plurality of differential mechanisms each mounted coaxially with the pivotal support of one of said devices on said frame, driving connections between one side of each of said differential mechanisms and longitudinally corresponding wheels of said pairs, driving connections between the other side of each of said differential mechanisms and other longitudinally corresponding wheels of said pairs, and means for driving said differential mechanisms.

2. In a motor vehicle, a frame, a plurality of longitudinally extending equalizing devices pivotally mounted intermediate their ends on said frame, a plurality of transverse pairs of road wheels, parallel linkage suspensions connecting said transverse pairs of wheels with said devices, a main differential mechanism disposed between said devices, a plurality of outboard differential mechanisms each mounted coaxially with the pivotal support of one of said devices on said frame, driving connections between said main differential and said outboard differential mechanisms, driving connections between one side of each of said outboard differential mechanisms and longitudinally corresponding wheels of said pairs, and driving connections between the other side of each of said outboard differential mechanisms and other longitudinally corresponding wheels of said pairs.

3. In a motor vehicle, a frame, a plurality of longitudinally extending equalizing devices having oppositely extending arms pivotally mounted on said frame, a pair of road wheels mounted on each of said arms by means comprising a parallel linkage suspension, a main differential mechanism disposed between said equalizing devices, a plurality of outboard differential mechanisms each mounted coaxially with the pivotal support of the arms of one of said equalizing devices on said frame, driving connections between said main differential and said outboard differential mechanisms, and driving connections for transverse differentiation between each one of said outboard differential mechanisms and both pairs of said wheels on the associated equalizing device.

4. In a driving wheel suspension for motor vehicles, a differential mechanism comprising a drive shaft and a plurality of driven members, oppositely extending arms pivotally mounted coaxially with said drive shaft, pairs of road wheels mounted on said arms adjacent the free ends thereof by means comprising parallel linkage suspensions, drive connections between one of the driven members of said differential mechanism and said road wheels on one side of said arms, and drive connections between the other of the driven members of said differential mechanism and said road wheels on the other side of said arms.

5. In a driving wheel suspension for motor vehicles, a differential mechanism comprising a drive shaft and a plurality of driven members, oppositely extending arms pivotally mounted coaxially with said drive shaft, pairs of road wheels mounted on said arms adjacent the free ends thereof by means allowing vertical movement of each of said wheels with respect to its arm, drive connections between one of the driven members of said differential mechanism and wheels on one side of said arms, and drive connections between the other of the driven members of said differential mechanism and said wheels on the other side of said arms.

6. In a motor vehicle, a frame, similar supporting and driving arrangements on opposite sides thereof, each arrangement including a longitudinal equalizer beam, a forward pair of wheels, first equalizing means for mounting said forward pair of wheels at one end of said equalizer beam, a rearward pair of wheels, second equalizing means for mounting said rearward pair of wheels at the other end of said equalizer beam, differential driving means extending from said frame to each of said arrangements, and driving means extending therefrom to each wheel of said forward and rearward pairs to drive said wheel differentially transversely of the vehicle and non-differentially longitudinally of the vehicle.

7. In a motor vehicle, a frame, a differential mechanism comprising a drive shaft and a pair of differentially driven members, an equalizer beam pivoted on said frame coaxially with said drive shaft, wheels mounted on one side of said beam for vertical movement with respect thereto, means connecting said wheels and one of said differentially driven members for rotation in unison, other wheels mounted on the other side of said beam for vertical movement with respect thereto, and means connecting said other wheels and the other of said differentially driven members for rotation in unison.

8. In a motor vehicle, a frame, a differential mechanism comprising a drive shaft and a pair of differentially driven members, an equalizer beam pivoted on said frame coaxially with said drive shaft, wheels mounted on one side of said beam for vertical movement with respect thereto, means unaffected by said vertical movement connecting said wheels and one of said dierentially driven members for rotation in unison, other wheels mounted on the other side of said beam for vertical movement with respect thereto, and means unaffected by said vertical movement connecting said other wheels and the other of said differentially driven members for rotation in unison.

9. In a motor vehicle, a frame, a differential mechanism comprising a drive shaft and a pair of differentially driven members, an equalizer beam pivoted on said frame coaxially with said drive shaft, wheels mounted on one side of said beam for vertical movement with respect thereto, chain driving means connecting said wheels and one of said differentially driven members, other wheels mounted on the other side of said beam for vertical movement with respect thereto, and chain driving means connecting said other wheels and the other of said differentially driven members.

10. In a motor vehicle, a frame, a differential mechanism comprising a drive shaft and a pair of differentially driven members, an equalizer beam pivoted on said frame coaxially with said drive shaft, a pair of ground-engaging wheels mounted on said beam for vehical movement in opposite directions with respect thereto, and a pair of driving chains, each connecting one of said wheels to one of said differentially driven members.

11. In a motor vehicle, a frame, a pair of coaxial differentially driven members, a beam pivoted on said frame coaxially with said driven members, a pair of ground-engaging wheels disposed one on each side of said beam, means for mounting said wheels on said beam for vertical movement with respect thereto in mutually opposite directions, means connecting one of said wheels for rotation in unison with one of said driven members, and means connecting the other of said wheels for rotation in unison with the other of said driven members.

12. In a motor vehicle, a frame, an equalizer, a plurality of pairs of wheel supports, ground engaging wheels rotatably mounted on said wheel supports, a plurality of pairs of suspension links pivotally mounted on said equalizer and pivotally connected to said wheel supports, and driving means for said wheels comprising differential mechanism mounted on said frame and driving connections between each of said wheels and said differential mechanism.

13. In a motor vehicle, a frame, an equalizer, a plurality of pairs of wheel supports, ground engaging wheels rotatably mounted on said wheel supports, each pair of wheels being in substantial alignment transversely of said equalizer, a plurality of pairs of suspension links pivotally mounted on said equalizer and pivotally connected to said wheel supports, and driving means for said wheels comprising a differential mechanism mounted on said frame and driving connections between each of said wheels and said differential mechanism.

14. In a motor vehicle, a frame, an equalizer mounted to pivot about an axis on said frame, a plurality of pairs of suspension links mounted to pivot about axes on said equalizer substantially normal to the pivotal axis upon which said equalizer is mounted, a pair of ground engaging wheels supported upon each of said pairs of suspension links by pivotal connections, the axes of which are parallel to the axes of the pivotal connections between said links and said equalizer, and driving means for said wheels comprising a differential mechanism mounted on said frame and driving connections between each of said wheels and said differential mechanism.

15. In a motor vehicle, a frame, an equalizer mounted to pivot about an axis on said frame, a pair of suspension links mounted on said equalizer to pivot about axes substantially normal to the pivotal axis upon which said equalizer is mounted and radially spaced from said axis, a second pair of suspension links mounted on said equalizer to pivot about axes substantially normal to the pivotal axis on which said equalizer is mounted and radially spaced from said axis a distance equal and opposite to said first suspension links, a pair of ground engaging wheels pivotally mounted upon each of said pairs of suspension links, and driving means for said wheels comprising a differential mechanism mounted on said frame and driving connections between each of said wheels and said differential mechanism.

16. In a motor vehicle, a frame, an equalizer mounted to pivot about an axis on said frame, a plurality of pairs of suspension links mounted to pivot about axes on said equalizer substantially normal to the pivotal axis upon which said equalizer is mounted, a pair of ground engaging wheels supported upon each of said pairs of suspension links by pivotal connections, the axes of which are parallel to the axes of the pivotal connections between said links and said equalizer, and driving means for said wheels comprising a differential mechanism mounted on said frame coaxially with the pivotal support of said equalizer, and driving connections between each of said wheels and said differential mechanism.

17. In a motor vehicle, a frame, an equalizer mounted to pivot about an axis on said frame, a pair of suspension links mounted on said equalizer to pivot about axes substantially normal to the pivotal axis upon which said equalizer is mounted and radially spaced from said axis, a second pair of suspension links mounted on said equalizer to pivot about axes substantially normal to the pivotal axis on which said equalizer is mounted and radially spaced from said axis a distance equal and opposite to said first suspension links, a pair of ground engaging wheels pivotally mounted upon each of said pairs of suspension links, and driving means for said wheels comprising a differential mechanism mounted on said frame coaxially with the pivotal support of said equalizer, and driving connections between each of said wheels and said differential mechanism.

18. In a motor vehicle having a frame and parallel linkage wheel suspensions each comprising a pair of wheel supports, ground engaging wheels rotatably mounted on said wheel supports, and a pair of suspension links pivotally connected at their opposite ends to said wheel supports and pivotally supported intermediate their ends on said frame; driving means for said wheels comprising driving members mounted on said frame equidistant from the rotational axes of the respective wheels in any displaced position of said wheels, and flexible driving connections between each of said wheels and said driving members.

19. In a motor vehicle having a frame and parallel linkage wheel suspensions each comprising a pair of wheel supports, ground engaging wheels rotatably mounted on said wheel supports, and means comprising members pivotally supported on said frame and pivotally connected to said wheel supports, for constraining said wheels to remain vertical and to maintain their rotational axes parallel to each other while permitting equal and opposite movement of said wheels with respect to said frame; driving means for said wheels comprising driving members mounted on said frame equidistant from the rotational axes of the respective wheels in any displaced position of said wheels, and flexible driving connections between each of said wheels and said driving members.

20. In a motor vehicle having a frame and parallel linkage wheel suspensions each comprising a pair of wheel supports, ground engaging wheels rotatably mounted on said wheel supports and spaced transversely of the vehicle, and a pair of suspension links pivotally connected at their opposite ends to said wheel supports and pivotally supported intermediate their ends on said frame; driving means for said wheels comprising differential mechanism having differentiating driving members mounted on said frame equidistant from the rotational axes of the respective wheels in any displaced position of said wheels, and flexible driving connections between each of said wheels and said driving members.

21. In a motor vehicle having a frame and parallel linkage wheel suspensions each comprising a pair of wheel supports, ground engaging wheels rotatably mounted on said wheel supports and spaced transversely of the vehicle, and means comprising members pivotally supported on said frame and pivotally connected to said wheel supports, for constraining said wheels to remain vertical and to maintain their rotational axes parallel to each other while permitting equal and opposite movement of said wheels with respect to said frame; driving means for said wheels comprising differential mechanism having differentiating driving members mounted on said frame equidistant from the rotational axes of the respective wheels in any displaced position of said wheels, and flexible driving connections between each of said wheels and said driving members.

THEODORE A. PETERMAN.